United States Patent
Atarius et al.

(10) Patent No.: US 11,290,501 B2
(45) Date of Patent: Mar. 29, 2022

(54) TRANSPORT LAYER PROTOCOL FOR SIP MESSAGE

(71) Applicant: Lenovo (Singapore) PTE. LTD., New Tech Park (SG)

(72) Inventors: Roozbeh Atarius, La Jolla, CA (US); Dimitrios Karampatsis, Ruislip (GB); Andreas Kunz, Ladenburg (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/537,053

(22) Filed: Aug. 9, 2019

(65) Prior Publication Data
US 2020/0053133 A1 Feb. 13, 2020

Related U.S. Application Data

(60) Provisional application No. 62/717,673, filed on Aug. 10, 2018.

(51) Int. Cl.
| | |
|---|---|
| H04L 29/06 | (2006.01) |
| H04L 65/10 | (2022.01) |
| H04L 65/1016 | (2022.01) |
| H04L 65/1069 | (2022.01) |
| H04L 65/1073 | (2022.01) |
| H04L 69/163 | (2022.01) |
| H04L 69/164 | (2022.01) |

(52) U.S. Cl.
CPC ...... *H04L 65/1006* (2013.01); *H04L 65/1016* (2013.01); *H04L 65/1069* (2013.01); *H04L 65/1073* (2013.01); *H04L 69/163* (2013.01); *H04L 69/164* (2013.01)

(58) Field of Classification Search
CPC ............. H04L 65/1006; H04L 65/1016; H04L 65/1069; H04L 65/1073; H04L 69/163; H04L 69/164

USPC .................................................. 370/310, 328
See application file for complete search history.

(56) References Cited

U.S. PATENT DOCUMENTS

| | | | | |
|---|---|---|---|---|
| 2008/0280623 | A1* | 11/2008 | Danne | H04L 65/1006 455/453 |
| 2016/0226925 | A1* | 8/2016 | Chebolu | H04L 65/1006 |
| 2017/0332276 | A1* | 11/2017 | Gonzalez de Langarica | H04L 65/1076 |

FOREIGN PATENT DOCUMENTS

| | | | | |
|---|---|---|---|---|
| GB | 2443238 | A * | 4/2008 | ....... H04L 29/12537 |
| GB | 2513597 | A | 5/2014 | |
| WO | 2013091733 | A1 | 6/2013 | |

OTHER PUBLICATIONS

PCT/IB2019/000894, "Notification of Transmittal of the International Search Report and the Written Opinion of the International Searching Authority, or the Declaration", PCT International Searching Authority, dated Jan. 28, 2020, pp. 1-12.

\* cited by examiner

*Primary Examiner* — Obaidul Huq

(74) *Attorney, Agent, or Firm* — Kunzler Bean & Adamson

(57) ABSTRACT

Apparatuses, methods, and systems are disclosed for selecting a transport layer protocol for SIP messaging. One apparatus includes a processor and a transceiver that receives a SIP message from a remote unit, the SIP message comprising a first request to initiate a session for an IMS MMTEL. The processor determines that the SIP message is communicated using TCP as a transport layer protocol and forwards the first request to a network entity, wherein the first request is sent using UDP as the transport layer protocol.

23 Claims, 10 Drawing Sheets

TRANSPORT LAYER PROTOCOL FOR SIP MESSAGE

CROSS-REFERENCE TO RELATED APPLICATIONS

This application claims priority to U.S. Provisional Patent Application No. 62/717,673 entitled "EPS FALLBACK EMPLOYING TCP" and filed on Aug. 10, 2019 for Roozbeh Atarius, Dimitrios Karampatsis, and Andreas Kunz, which is incorporated herein by reference.

FIELD

The subject matter disclosed herein relates generally to wireless communications and more particularly relates to selecting a transport layer protocol for SIP messaging, particularly for IMS signaling.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Access and Mobility Management Function ("AMF"), Positive-Acknowledgment ("ACK"), Access Stratum ("AS"), Base Station ("BS"), Binary Phase Shift Keying ("BPSK"), Bandwidth Part ("BWP"), Clear Channel Assessment ("CCA"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Globally Unique Temporary UE Identifier ("GUTI"), Hybrid Automatic Repeat Request ("HARQ"), Internet-of-Things ("IoT"), International Mobile Subscriber Identity ("IMSI"), Licensed Assisted Access ("LAA"), Load Based Equipment ("LBE"), Listen-Before-Talk ("LBT"), Long Term Evolution ("LTE"), Multiple Access ("MA"), Mobility Management Entity ("MME"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), New Generation Node B ("gNB"), New Generation Radio Access Network ("NG-RAN", a RAN used for 5GS networks), New Radio ("NR"), Non-Access Stratum ("NAS"), Non-Orthogonal Multiple Access ("NOMA"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RA", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management Function ("SMF"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Data Management ("UDM"), Uplink Control Information ("UCI"), User Entity/Equipment (Mobile Terminal) ("UE"), Uplink ("UL"), User Plane ("UP"), Universal Mobile Telecommunications System ("UMTS"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

When a UE is connected to the 5G network, the UE can receive a request for an IMS MMTEL (voice) call setup, but the radio access network ("RAN") may not assign radio resource and may reject the IMS MMTEL setup. This rejection may be due to the operator preferring to redirect the UE to EPS instead of inter-RAT handover. In addition, there may be numerous cases when there is a modification needed for an established QoS flow (e.g. due to forked call), which need to be handled (or rejected) in 5GS before the UE is moved to EPS. Also, any further QoS flow establishment request on 5GS would anyway need to be rejected when a mobility procedure is ongoing.

Accordingly, the NG-RAN may reject an IMS MMTEL (voice) session to trigger the core network (e.g., 5GS) to redirect the IMS MMTEL session to EPS. This fallback from 5GS to EPS may happens at the time of IMS voice session setup and at the time when the P-CSCF allocates core network QoS flows which may eventually be mapped to RAN bearers by the gNB. Currently, there is no direct communications between the RAN and the IMS core and therefore if this fallback does not occur within the exchange of the IMS session setup, some IMS signaling may be lost. The likelihood of losing IMS signaling may increase if the 5GS and EPS are implemented with AMF and MME having no direct connection i.e. N26 interface.

BRIEF SUMMARY

Herein, UE and IMS network behavior is described for avoiding the loss of IMS signaling (e.g., during EPS fallback) by employing a TCP connection between the UE and P-CSCF. Methods for an EPS fallback employing TCP connection are disclosed. Apparatuses and systems also perform the functions of the methods.

A first method for selecting a transport layer protocol for SIP messaging includes receiving a SIP message from a remote unit, the SIP message comprising a first request to initiate a session for an IMS MMTEL and determining that the SIP message is communicated using TCP as a transport layer protocol. The method includes forwarding the first request to a network entity, wherein the first request is sent using UDP as the transport layer protocol.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
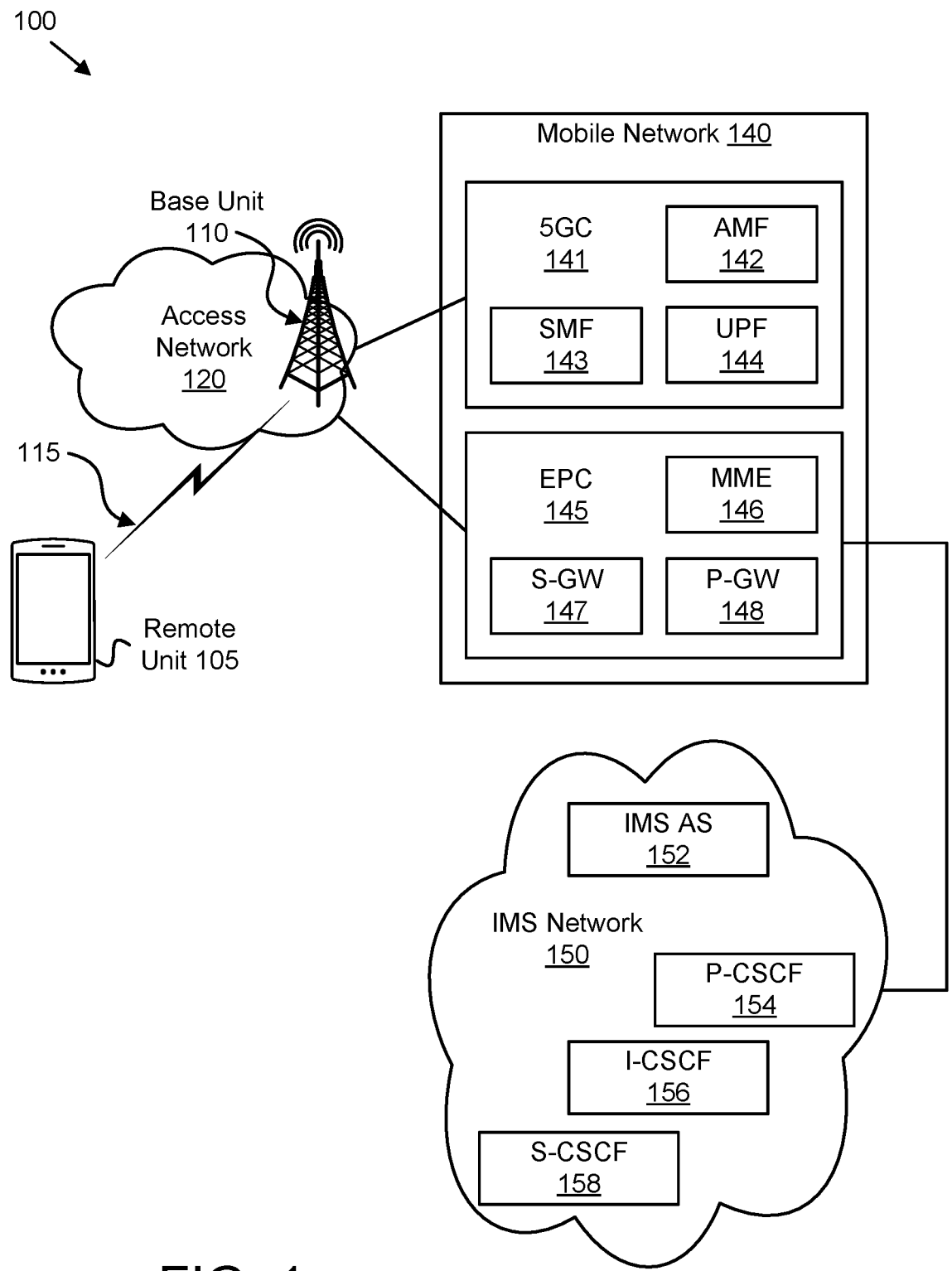
FIG. 1 is a schematic block diagram illustrating one embodiment of a wireless communication system for selecting a transport layer protocol for SIP messaging.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus that prevent losing IMS signaling during EPF fallback, especially in the case where there is no direct connection (e.g., no N26 interface) between the 5GC AMF and the EPC MME. In various embodiments, a TCP connection is established between the UE and a P-CSCF in the IMS network and this TCP connection is used to send SIP requests/responses. Moreover, the systems, methods, and apparatus select a transport layer protocol for SIP messages, e.g., used with IMS signaling.

In various embodiments, a UE registers to the IMS network by adding its capabilities for the MMTEL service by adding the MMTEL IMS service communication service identifier (ICSI) and/or MMTEL IMS application reference identifier (IAR) to at least one of the Contact header field, The Accept-Contact header field, the Feature-Caps header field, etc. of the SIP REGISTER request.

In some embodiments, the UE indicates its preference to the IMS network that the transport by adding the parameter "transport=tcp" to the Contact header field of the SIP REGISTER request. Here, the value "transport=tcp" indicates the UE preference for TCP. Note that a value of "transport=udp" would indicate a UE preference for UDP.

FIG. 1 depicts a wireless communication system 100 for selecting a transport layer protocol for SIP messaging, according to embodiments of the disclosure. In one embodiment, the wireless communication system 100 includes at least one remote unit 105, an access network 120 including at least one base unit 110, a mobile core network 140, and an IMS network 150. The access network 120 and the mobile core network form a mobile communication network. The access network 120 may include a 3GPP access network and/or a non-3GPP access network (e.g., Wi-Fi).

The remote units 105 communicate with the access network 120 using a wireless communication links 115. For example, a remote unit 105 may communicate with a 3GPP access network using 3GPP communication links and may communicate with a non-3GPP access network using non-3GPP communication links. Even though a specific number of remote units 105, access networks 120, base units 110, wireless communication links 115, and mobile core networks 140 are depicted in FIG. 1, one of skill in the art will recognize that any number of remote units 105, access networks 120, base units 110, communication links 115, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the 3GPP access network 120 via uplink ("UL") and downlink ("DL") communication signals. Furthermore, the UL and DL communication signals may be carried over the 3GPP communication links 115. Here, the access networks 120 is an intermediate network that provide the remote units 105 with access to the mobile core network 140.

In some embodiments, the remote units 105 access services in the IMS network 150 via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the access network 120. The mobile core network 140 then relays traffic between the remote unit 105 and the IMS network 150 using the PDU session. Note that the remote unit 105 may establish one or more PDU sessions (or other data connections) with the mobile core network 140. As such, the remote unit 105 may have at least one PDU session for communicating with the IMS network 150. The remote unit 105 may establish additional PDU sessions for communicating with other data network and/or other remote hosts.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of radio access network are not illustrated but are well known generally by those having ordinary skill in the art. The base units 110 connect to the mobile core network 140 via the access network 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In various embodiments, the mobile core network 140 may include a 5G core ("5GC") 141 and the evolved packet core ("EPC") 145, which may be coupled to a data network, like the Internet and private data networks, among other data networks. As depicted, the mobile core network 140 is also coupled to an IMS network 150. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The depicted 5GC 141 includes several network functions ("NFs"). As depicted, the 5CG 141 includes multiple user plane functions ("UPFs"). Here, the mobile core network 140 includes at least one UPF 144 that serves the access network 120. The mobile core network 140 also includes multiple control plane functions including, but not limited to, an Access and Mobility Management Function ("AMF") 142 that serves the access network 120, and a Session Management Function ("SMF") 143. In certain embodiments, the mobile core network 140 may also include an Authentication Server Function ("AUSF"), a Network Repository Function ("NRF") (used by the various NFs to discover and communicate with each other over APIs), a Policy Control Function ("PCF"), and a Unified Data Management function ("UDM"), or other NFs defined for the 5GC.

The depicted EPC 145 includes various network entities, including the MME 146, the S-GW 147, the P-GW 148, and may include additional entities as understood in the art. Although specific numbers and types of core network entities and network functions are depicted in FIG. 1, one of skill in the art will recognize that any number and type of core network entities and/or network functions may be included in the mobile core network 140.

In various embodiments, the mobile core network 140 supports different types of mobile data connections and different types of network slices, wherein each mobile data connection utilizes a specific network slice. The different network slices are not shown in FIG. 1 for ease of illustration, but their support is assumed.

As discussed above, the remote units 105 may communicate with the IMS network 150 via a data path that passes through the mobile core network 140. For example, the mobile core network 140 may relay IMS signaling and/or media traffic between the remote unit 105 and the IMS application server 152 using the data path. In some embodiments, the remote unit 105 may connect to the IMS network 150 via the 5G core network 141. In certain embodiments, the remote unit 105 may connect to (e.g., fallback to) the EPC 145 in order to access services in the IMS network 150.

The IMS network 150 is a network for providing IP-based multimedia services, for example to the remote unit 105. As depicted, the IMS network 150 includes an IMS application server ("AS") 152. Here, the IMS AS 152 hosts and/or executes multimedia services, such as IMS MMTEL. In certain embodiments, the IMS AS152 is a SIP application server. As depicted, the IMS network 150 also includes a plurality of call session control functions ("CSCF"), including the proxy-CSCF ("P-CSCF") 154, the interrogating-CSCF ("I-CSCF") 156, and serving-CSCF ("S-CSCF") 158. The CSCFs 154-158 may be SIP functions providing control plane services for the IMS network 150.

As noted above, a remote unit 105 connected to the 5GC 141 may be unable to access the IMS network 150 for MMTEL service (e.g., due to lack of N26 interface in the mobile core network 140 connecting the AMF 142 to the MME 146), thus requiring fallback to the EPC 145. However, the EPS fallback introduces extra delay to IMS MMTEL session setup which can result in loss on IMS signaling (and thus even more delay).

To prevent the loss of IMS signaling, the remote unit 105 may rely on transmission control protocol (TCP) rather than user datagram protocol (UDP) for guaranteed delivery of the SIP signaling. Unlike UDP which is connectionless protocol and the sender may transmit the data packets towards the receiver with no order, the TCP is a connection based protocol where the sender and the receiver may set up a connection in priori to transmission and reception of the data packets to guarantee the reception of the sent data packets. The data packets may be received in the order they have been transmitted. Although TCP offers reliability, it may come at the cost of higher transmission time, header overhead which may be 2.5 times of that of UDP, mandatory acknowledgment on the recipient side, and handshaking of sender and recipient.

On the terminating side of e.g., IMS MMTEL session setup, when the IMS network 150 transmits a SIP message (request or response), the transport layer protocol will be TCP. However, on the originating side of e.g., IMS MMTEL session setup, the remote unit 105 may decide what transport layer protocol needs to be employed. In certain embodiments, the remote unit 105 is aware that N26 is not supported through the NAS when registering to the 5GC 141. In such embodiment, when the remote unit 105 sets up MMTEL service, it will automatically start the dialog by sending a SIP INVITE request carried over TCP transport layer protocol.

According to RFC 3261, the transport mechanism is on hop-to-hop basis and is not end-to-end and if the user agent client (UAC), which is remote unit 105 in our case, sends a SIP message carried over a certain transport layer protocol, some implemented features in user agent server (UAS), which is P-CSCF 154 in our case, decides what transport protocol should be employed in the next link of the path to the end-user when UAS forward the SIP message. Thus, it is up to P-CSCF 154 to determine what transport protocol to employ when the UE 205 initiates the SIP INVITE request for the IMS MMTEL service which was carried by the TCP transport layer protocol.

As an end-to-end TCP connection may be undesirable (e.g., due to increased overhead association with TCP as compared to UDP), a SIP message (e.g., SIP INVITE) carried over TCP does not trigger an end-to-end TCP connection from the originating remote unit 105 to the terminating remote unit 105. Therefore, the P-CSCF 154 in the originating side may convert the TCP transport layer protocol to the UDP transport layer protocol in this situation where the originating remote unit 105 employs TCP due to the lack of N26 and also the IMS MMTEL being the triggered service.

Accordingly, when using SIP messages to setup a session (e.g., IMS MMTEL session), the remote unit 105 and P-CSCF 154 employ TCP as the transmission protocol, rather than UDP, in order to guarantee delivery of the SIP messages. However, as the connection between P-CSCF 154 and S-CSCF 158 is fixed, the P-CSCF 154 may employ UDP when communicating with the S-CSCF 158 in order to benefit from quicker transmission times and lower overhead. Thus, the P-CSCF 154 may convert SIP-over-TCP signaling (used over the path between remote unit 105 and P-CSCF 154) to SIP-over-UDP signaling (e.g., used over the path between P-CSCF 154 and S-CSCF 158), and vice versa.

Figure 2:
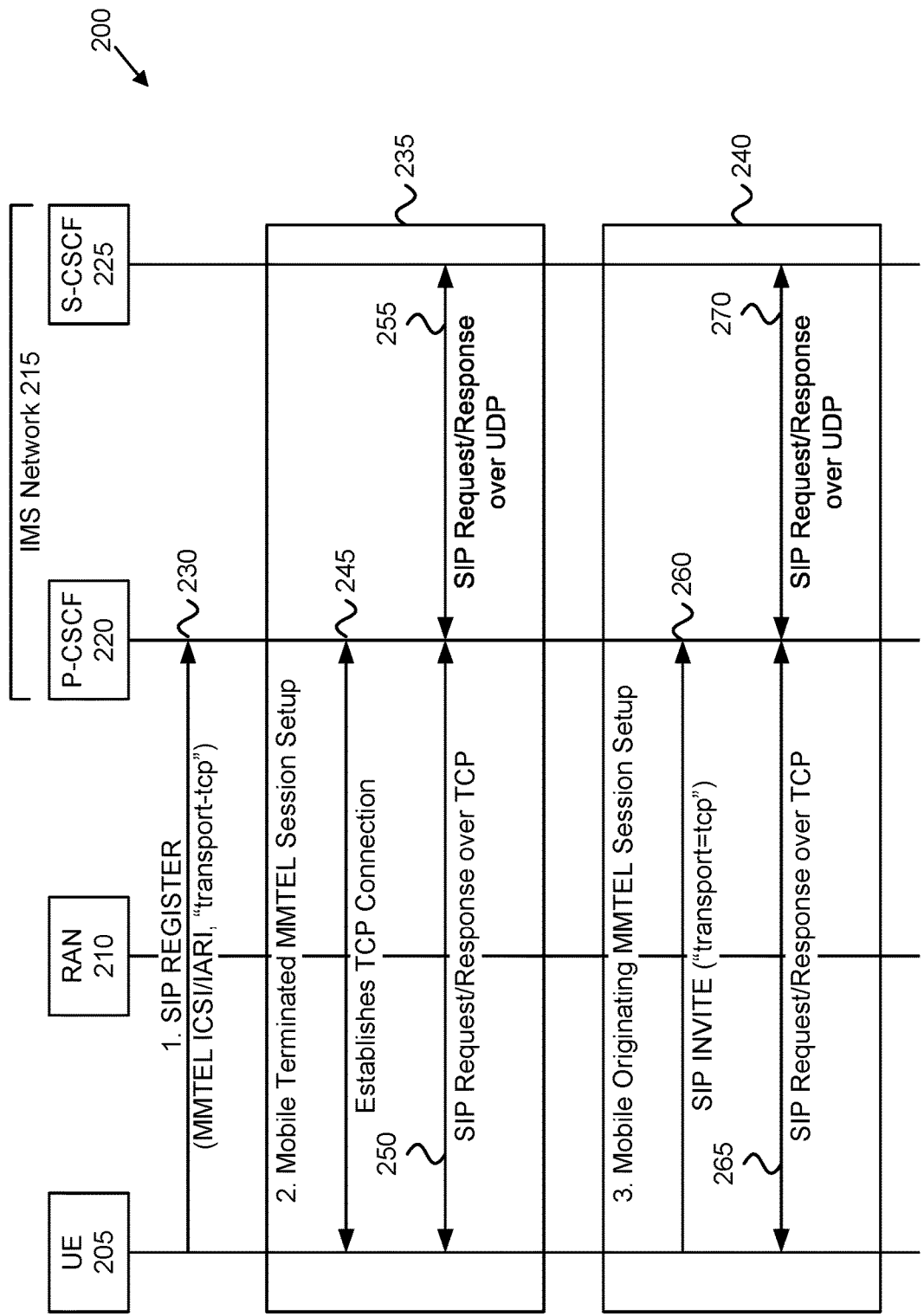
FIG. 2 is a diagram illustrating a third embodiment of a signaling flow for selecting a transport layer protocol for SIP messaging.

FIG. 2 depicts a network procedure 200 between the UE and IMS for selecting a transport layer protocol for SIP messaging and improved EPS fallback by using TCP, according to embodiments of the disclosure. The network procedure 200 involves a UE 205, a RAN 210, and an IMS network 215, where the IMS network 215 includes at least P-CSCF 220 and S-CSCF 225. The UE 205 may be one embodiment of the remote unit 105 described above, the RAN 210 may be one embodiment of the access network 120 described above, and the IMS network 215 may be one embodiment of the IMS network 150 described above.

The network procedure 200 prevents loss of IMS signaling during 5GS-to-EPS fallback (e.g., triggered by IMS MMTEL session setup, as described above) by employing TCP as the transport layer protocol on the path between the UE 205 and the IMS network 215. However, the P-CSCF 220 selectively converts SIP-over-TCP signaling to SIP-over-UDP signaling, and vice versa to improve efficiency as described above.

The network procedure 200 begins at Step 1 as the UE 205 registers to the IMS network 215. The UE 205 sends a SIP Register message to the P-CSCF 220 (see messaging 230). Within the SIP Register message, the UE 205 adds its capabilities for the MMTEL service. In some embodiments, the UE 205 adds the MMTEL IMS service communication service identifier (ICSI) to at least one of the Contact header field, the Accept-Contact header field, the Feature-Caps header field, etc. of the SIP REGISTER request. In other embodiments, the UE 205 adds the MMTEL IMS application reference identifier (IARI) to at least one of the Contact header field, the Accept-Contact header field, the Feature-Caps header field, etc. of the SIP REGISTER request.

To solve the problem of losing IMS signaling (e.g., during EPS fallback), the UE 205 may indicate to the IMS network 215 (e.g., upon registration) its preference to use TCP. In TCP solution, the UE 205 at the time of IMS registration may insert the transport parameter to TCP (i.e., setting the value "transport=tcp") in the Contact header field of the SIP REGISTER request to identify its preferences that all the incoming SIP messages (request or response) be carried over TCP transport layer protocol, independent of being for dialogs or standalone messages. At a later point, the UE 205 establishes a MMTEL session with the IMS network 215, either setting up a mobile terminated MMTEL session 235 or a mobile-originating MMTEL session 240.

Figure 4A:
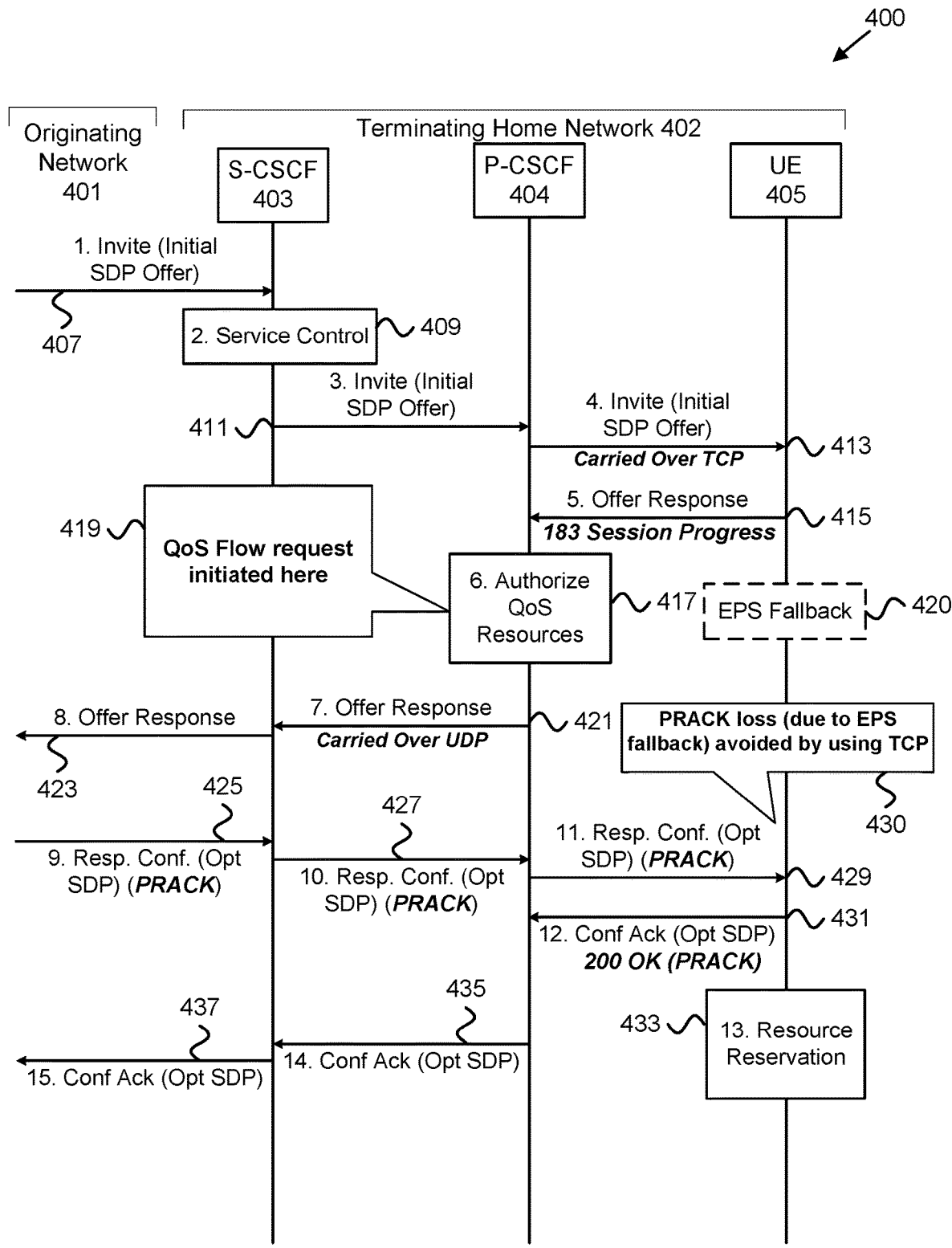
FIG. 4A is a diagram illustrating one embodiment of a signaling flow for mobile-terminated MMTEL call setup.
Figure 4B:
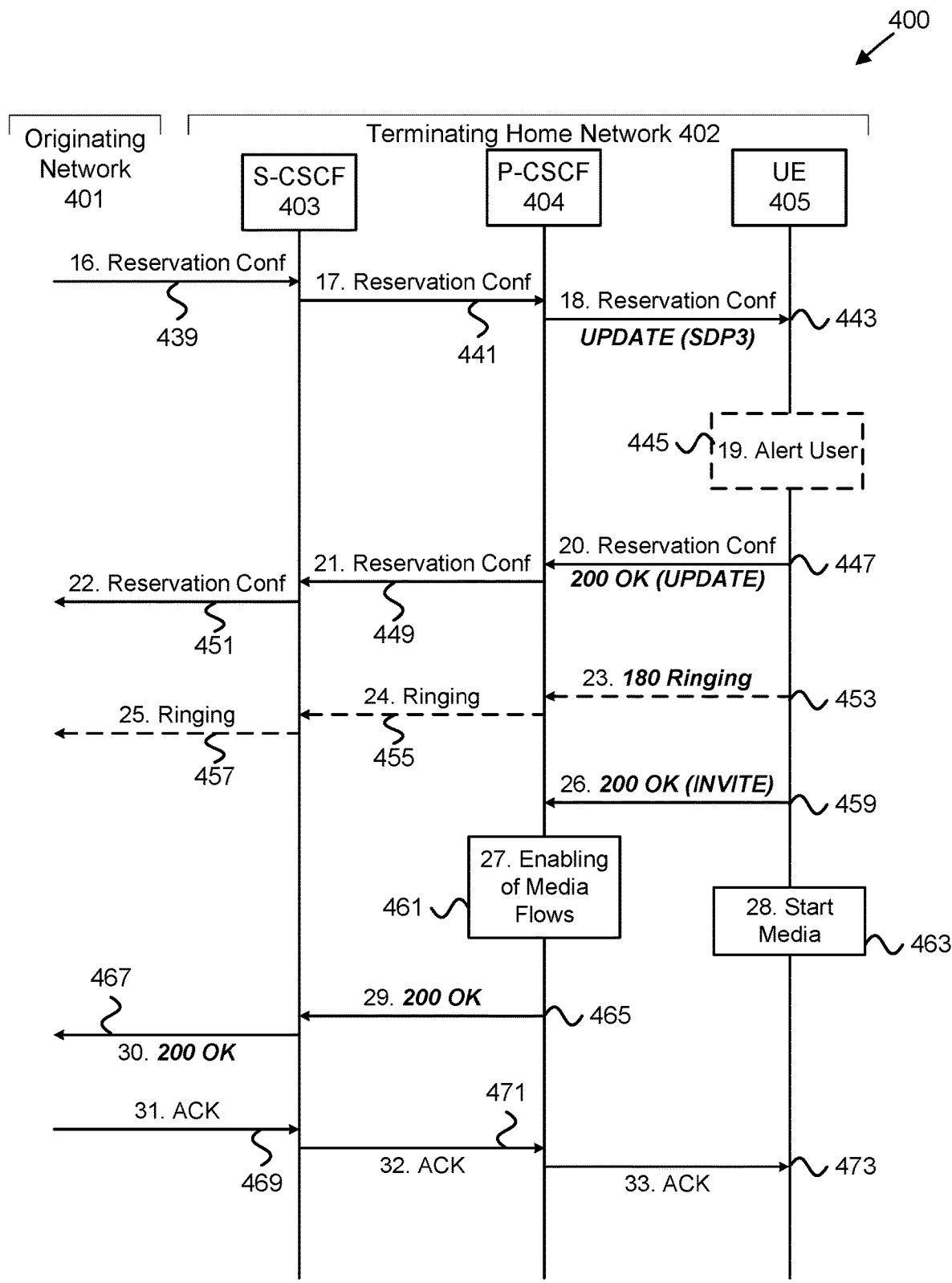
FIG. 4B is a continuation of FIG. 4A.

Step 2 shows the scenario of Mobile-Terminated ("MT") MMTEL session setup (see block 235). During the MT use case, the P-CSCF 220 establishes a TCP connection towards the UE 205 (see messaging 245). Because the UE 205 has indicated its transport layer preference to the IMS network 215, the P-CSCF 220 knows to establish the TCP connection. Additionally, the P-CSCF 220 forwards any SIP request or any SIP response towards the UE 205 using the TCP connection (see messaging 250) and employs the UDP transport protocol to forward any SIP request or any SIP response towards the S-CSCF 225 (see messaging 255). Accordingly, the P-CSCF 220 converts a SIP Request/Response sent using UDP (see messaging 255) to a SIP Request/Response using TCP (see messaging 250), and vice versa. The SIP request may be to establish a dialog or may be as a standalone message towards the UE. FIGS. 4A-4B describe MT MMTEL session setup in greater detail.

Step 3 shows the scenario of Mobile-Originating ("MO") MMTEL session setup (see block 240). During the MO use case, the UE 205 constructs a SIP INVITE request that indicates a TCP connection (see messaging 260). In various embodiments, the UE 205 indicates the TCP connection by at least: setting the transport protocol in the Via header field to TCP; adding transport parameter set to TCP in the Via header field; and/or adding transport parameter set to TCP in the Contact header field. Additionally, the UE 205 establishes an MMTEL session sending the SIP INVITE request carried by TCP transport layer protocol towards the P-CSCF 220.

Figure 5A:
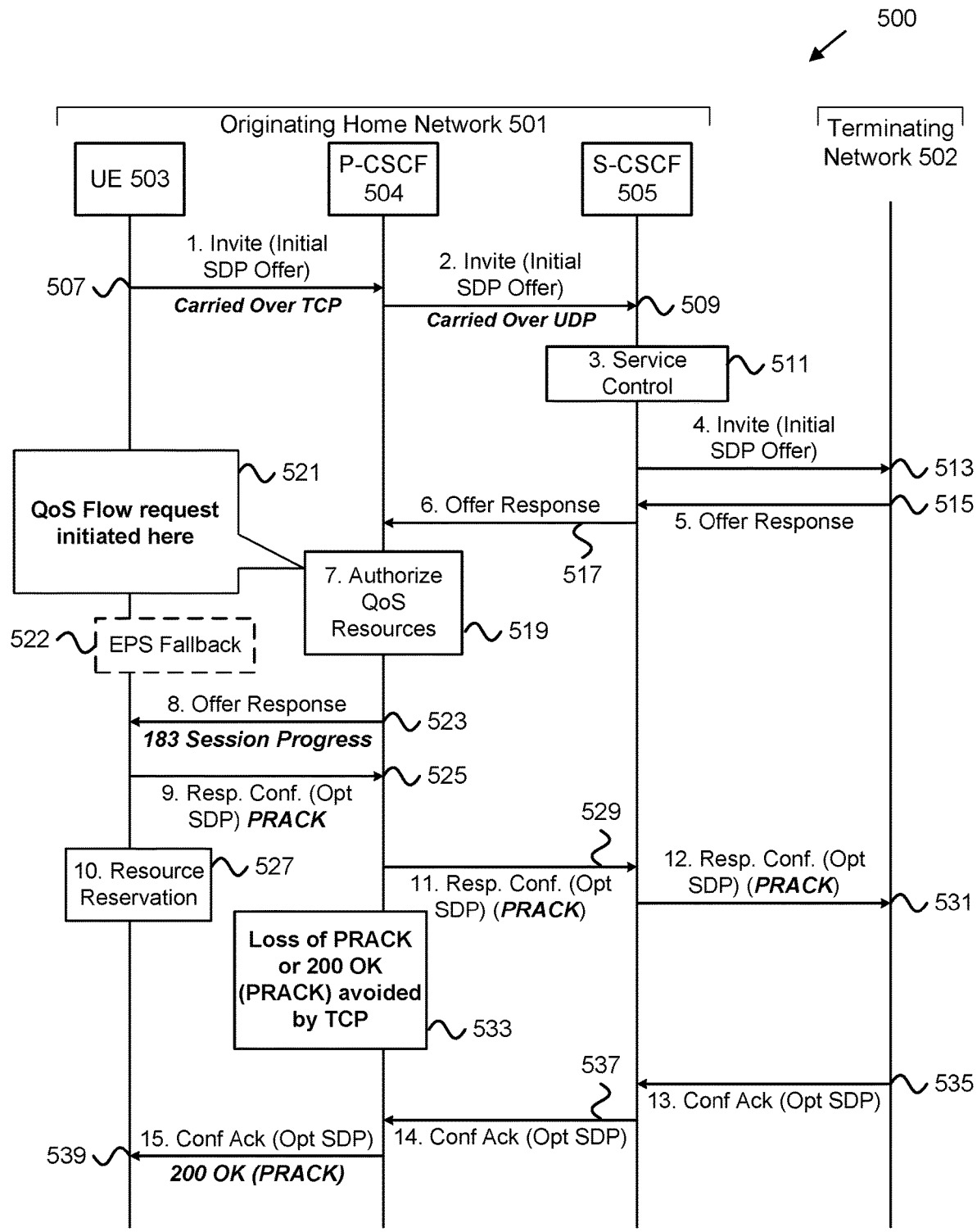
FIG. 5A is a diagram illustrating one embodiment of a signaling flow for R mobile-originating MMTEL call setup.
Figure 5B:
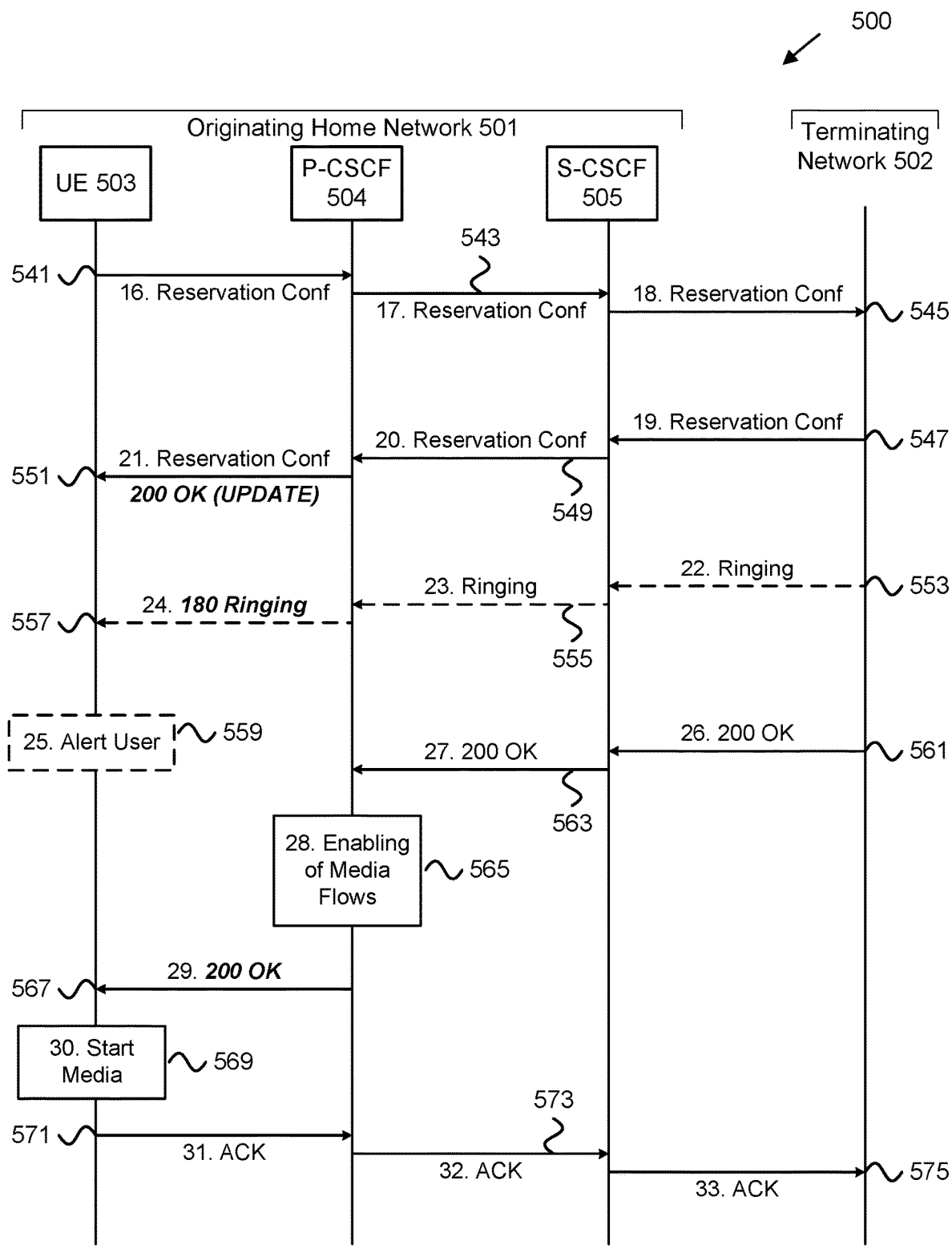
FIG. 5B is a continuation of FIG. 5A.

Upon receiving the SIP INVITE request that is at least a SIP INVITE request to establish an MMTEL session; a SIP INVITE request which is carried over TCP transport layer protocol; and because the UE 205 has registered its preference for TCP transport protocol to carry all terminating SIP requests or SIP responses, the P-CSCF 220 forwards any SIP request or any SIP response towards the UE 205 using the TCP connection (see messaging 265) and employs the UDP transport protocol to forward any SIP request or any SIP response towards the S-CSCF 225 (see messaging 270). Accordingly, the P-CSCF 220 converts a SIP Request/Response sent using UDP (see messaging 270) to a SIP Request/Response using TCP (see messaging 265), and vice versa. The SIP request may be to establish a dialog or may be as a standalone message towards the UE. Note that the P-CSCF 220 may employ the UDP transport protocol to forward the SIP INVITE request to establish an MMTEL session towards the S-CSCF. FIGS. 5A-5B describe MO MMTEL session setup in greater detail.

Figure 3:
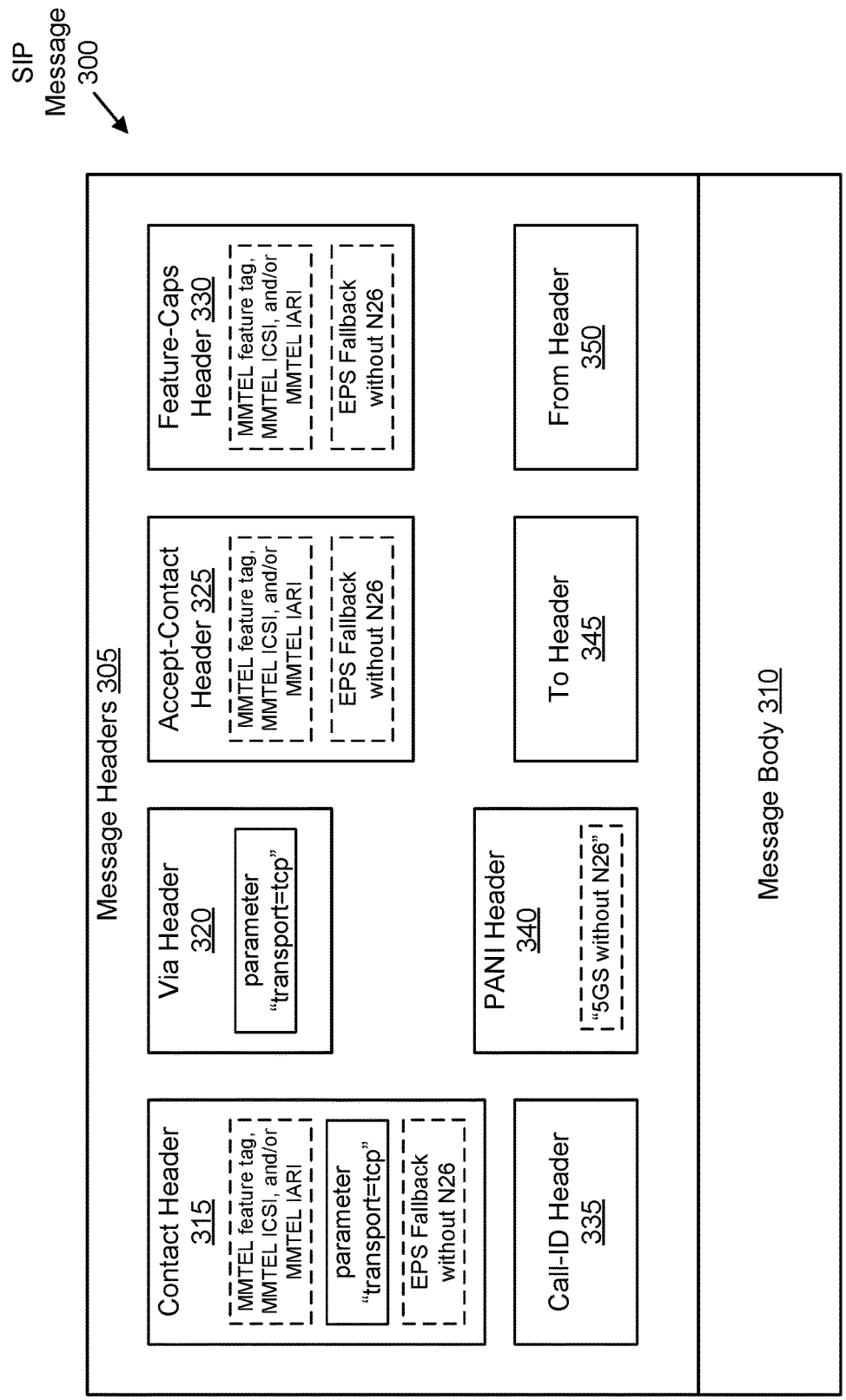
FIG. 3 is a diagram illustrating one embodiment of a SIP message.

FIG. 3 depicts an exemplary SIP message 300, according to embodiments of the disclosure. In one embodiment, the SIP message 300 is a SIP REGISTER request used by the remote unit 105 and/or UE 205 to indicate its transport layer preference when registering to an IMS network. In another embodiment, the SIP message 300 is a SIP INVITE request used by the remote unit 105 and/or UE 205 to establish a MMTEL session using TCP connection to the P-CSCF 154 and/or P-CSCF 220. In other embodiments, the SIP message 300 may be another SIP request/response message.

The SIP message 300 includes a plurality of message headers 305 and a message body 310. The SIP message headers 305 include one or more of: a Contact header 315, a Via header 320, an Accept-Contact header 325, a Feature-Caps header 330, a Call-ID header 335, a P-Access Network Identifier ("PANT") 340, a "To" header 345, and a "From" header 350.

Several solutions may be implemented which assure that the TCP connection, e.g., for IMS signaling, is not end-to-end. Such solutions to help the P-CSCF 220 to make the decision to change the transport layer protocol from TCP to UDP in prior to forwarding the SIP-INVITE request towards the S-CSCF 225. These solutions may be implemented upon receiving a SIP INVITE request carried over TCP transport protocol when one or more of the below rules apply.

According to a first rule, TCP to UDP conversion is triggered if the SIP INVITE request is targeted to SIP URI and is not targeted to SIPS-URI. Note that in IMS (e.g., the IMS network 215 or IMS network 150) SIPS-URI is not permitted, thus this rule is for P-CSCF 220 to carry all the SIP requests or response by UDP when forwarding them towards the S-CSCF 225.

According to a second rule, TCP to UDP conversion is triggered if the SIP INVITE request includes at least one header field indicating to the IMS network that the UE is triggering the MMTEL application. Such an indication may be included in the Contact header field 315, the Accept-Contact header field 325, the Feature-Caps header field 330, etc. The indication may comprise an IMS MMTEL feature tag, an IMS MMTEL ICSI, and/or an IMS MMTEL IARI.

According to a third rule, TCP to UDP conversion is triggered if the SIP INVITE request includes the indication in a header field discussed in the second rule above, in addition to the P-CSCF 220 being aware at the time of UE's IMS registration that all SIP messages are preferred by the UE 205 to be transmitted to the UE 205 by use of TCP transport protocol. As discussed above with reference to FIG. 2, the UE 205 may send a SIP REGISTER request that indicates its transport layer preference.

According to a fourth rule, TCP to UDP conversion is triggered if the SIP INVITE request includes the indication in a header field discussed in the second rule above, in addition to that the P-Access Network Identifier (PANT) header 340 indicating the IP-CAN of 5GS without N26; meaning this IP-CAN not only identifies that the access network in 5GS but also the mobile core network 140 is missing the N26 interface between the AMF 142 and the MME 146.

According to a fifth rule, TCP to UDP conversion is triggered if the SIP INVITE request includes the indication in a header field discussed in the second rule above, in addition to an indication in at least one header field (such as the Contact header field, Accept-Contact header field, Feature-Caps header field, etc.) that indicates to the IMS network 215 that the UE 205 has the capabilities of EPS fallback without N26.

According to a sixth rule, TCP to UDP conversion is triggered if the SIP INVITE request includes the indication in a header field discussed in the second rule above, in addition that the P-CSCF 220 is aware at the time of UE's IMS registration, the UE's capability of EPS fallback without N26; meaning that the UE 205 inserted the feature tag, ICSI, and/or IARI for capability of EPS fallback without N26 in at least one header field such as the Contact header field, Accept-Contact header field, Feature-Caps header field etc.

According to a seventh rule, TCP to UDP conversion is triggered if operator's policy is to transport any incoming SIP request/response by UDP when forwarding them towards the S-CSCF 225.

FIGS. 4A-4B depicts a signaling flow 400 for mobile-terminated IMS MMTEL session setup procedure, according to embodiments of the disclosure. The signaling flow 400 involves an originating network 401, IMS elements (S-CSCF 403, P-CSCF 404) in a terminating home network 402, and a UE 405 in the terminating home network. As described above, IMS signaling may be lost due to 5GS-to-EPS fallback of the UE 405; however, the UE 405 may use a TCP connection to the P-CSCF 404 to avoid IMS signaling loss.

The mobile-terminated IMS MMTEL session setup procedure begins at Step 1 as the S-CSCF 403 receives a SIP INVITE request from the originating network 401 (see messaging 407). Here, the SIP INVITE message includes an Initial SDP Offer. As depicted at Step 2, the S-CSCF 403 performs Service Control (see block 409) and forwards the SIP INVITE request to the P-CSCF 404 at Step 3 (see messaging 411). At Step 4, the P-CSCF 404 in turn forwards the SIP INVITE request to the UE 405 (see messaging 413), which is the user agent client (UAC).

As discussed above, when the UE 405 registers with the IMS network, the UE 405 indicates its transport layer preference for TCP.

At Step 5, upon receipt of the initial Session Description Protocol (SDP) offer in a Session Initiation Protocol (SIP) INVITE request, the UE 405 may respond with an offer in a SIP 183 session in progress response (see messaging 415) and in Step 6 on the terminating side the P-CSCF 404 may authorize the QoS resources (see block 417). Here, the P-CSCF 404 attempts to set up a QoS flow for IMS MMTEL, e.g., via the RAN which may be a 5G-RAN (see 419).

However, the 5G-RAN may reject the PDU Session modification that may set up the QoS flow for IMS MMTEL. As discussed above, this rejection triggers the UE 405 to fallback to the EPS (see block 420). Moreover, if the N26 interface (connecting AMF 142 to the MME 146) is not employed, then the UE 405 may need to detach from the 5GS and fallback to the EPS by following the procedure for initial attachment to the EPS. This may take some time (i.e., introducing delay) and thereby IMS signaling may be lost if TCP is not employed between the UE 503 and P-CSCF 504.

At Step 7, after the QoS flow for IMS MMTEL is established, the P-CSCF 404 sends the SIP offer response to the S-CSCF 403 (see messaging 421) and the S-CSCF 403 forwards the SIP offer response to the originating network 401 in Step 8 (see messaging 423). At Step 9, the calling party responds with a Provisional Response Acknowledgement ("PRACK") which the S-CSCF 403 receives in a Response Confirm message (see messaging 425). Note that the Response Confirm message may optionally include an SDP offer (e.g., part of codec negotiation and resource allocation). At Step 10, the S-CSCF 403 sends the Response Confirm message indicating PRACK to the P-CSCF 404 (see messaging 427). At step 11, the P-CSCF 404 attempts to deliver the PRACK to the UE 405 (see messaging 429).

As noted above, EPS fallback introduces delay which could cause the Response Confirm message indicating PRACK to be lost (e.g., due to the UE 405 being unreachable during the fallback procedure). However, the UE 405 avoids IMS signaling loss by communicating with the P-CSCF 404 via TCP connection (see block 430). As described above, the TCP connection is not end-to-end, and the P-CSCF 404 may use UDP to communicate SIP messages with the S-CSCF 403.

At Step 12, the UE 405 responds to the PRACK with a SIP 200 OK message (see messaging 431). Where the Response Confirm includes an SDP offer, the 200 OK message may also include an SDP answer. At Step 13, the UE 405 reserves resources (e.g., to reflect the SDP answer, see block 433). At the same time, at Steps 14 and 15, the P-CSCF 404 and S-CSCF 403 forward the 200 OK message towards the originating network 401 (see messaging 435 and 437).

Continuing on FIG. 4B, at Step 16 the originating network 401 confirms resource reservation, e.g., by sending a SIP UPDATE message ($3^{rd}$ offer), towards the S-CSCF 403 (see messaging 439). At Steps 17 and 18, the S-CSCF 403 and P-CSCF 404 forward the SIP UPDATE message towards the UE 405 (see messaging 441 and 443). At step 19, the UE 405 alerts the user of the incoming MMTEL call (see block 445). Additionally, at step 20 the UE 405 confirms resource reservation, e.g., by sending a SIP 200 OK message for UPDATE, towards the P-CSCF 404 (see messaging 447). At Steps 21 and 22, the P-CSCF 404 and S-CSCF 403 forward the 200 OK message towards the originating network 401 (see messaging 449 and 451).

At Step 23, the UE sends a SIP 180 Ringing message towards the P-CSCF 404 (see messaging 453). At Steps 24 and 25, the P-CSCF 404 and S-CSCF 403 forward the SIP 180 Ringing message towards the originating network 401 (see messaging 455 and 457). Note that while FIG. 4B shows the UE 405 alerting the user to the incoming call before sending the 200 OK for UPDATE, in other embodiments the UE 405 may alert the after sending the 200 OK for UPDATE and before sending the 180 Ringing message, or even after sending the 180 Ringing message.

At Step 26, the user at UE 405 answers the call and the UE 405 responds to the SIP INVITE message (received at Step 4) by sending a SIP 200 OK message towards the P-CSCF 404 (see messaging 459). At step 27, the P-CSCF 404 enables media flows (see block 461). At step 28, the UE 405 starts media (see block 463). At steps 29 and 30, the P-CSCF 404 and S-CSCF 403 forward the 200 OK message (for INVITE) towards the originating network 401 (see messaging 465 and 467).

At step 31, the originating network 401 confirms the 200 OK message by sending an ACK message towards the S-CSCF 403 (see messaging 469). At Steps 32 and 33, the S-CSCF 403 and P-CSCF 404 forward the ACK message towards the UE 405 (see messaging 471 and 473). The signaling flow 400 ends.

FIGS. 5A-5B depict a signaling flow 500 for mobile-originating IMS MMTEL session setup procedure, according to embodiments of the disclosure. The signaling flow 500 involves a UE 503 in an originating home network 501, IMS elements (e.g., P-CSCF 504 and S-CSCF 505) in the originating home network 501, and a terminating network 502. As described above, IMS signaling loss due to 5GS-to-EPS fallback may also occur when the UE 503 is initiating an IMS MMTEL session; however, the UE 503 may use a TCP connection to the P-CSCF 504 to avoid IMS signaling loss.

The mobile-originating IMS MMTEL session setup procedure begins at Step 1 as the UE 503 sends a SIP INVITE request to the P-CSCF 504 (see messaging 507). Here, the SIP INVITE message includes an Initial SDP Offer. At Step 3, the P-CSCF 504 forwards the SIP INVITE request towards the S-CSCF 505 (see messaging 509) and the S-CSCF 403 performs Service Control at step 4 (see block 511). At Step 4, the S-CSCF 505 forwards the SIP INVITE request to the terminating network 502 (see messaging 513).

As discussed above, when the UE 405 registers with the IMS network, the UE 405 indicates its transport layer preference for TCP. Moreover, the UE 503 may indicate its transport layer preference for TCP in the SIP INVITE message (i.e., setting the transport protocol in the Via header field to TCP).

At Step 5, the end user client in the terminating network 502, upon receipt of the initial SDP offer in a SIP INVITE request, may respond with an offer in a SIP 183 session in progress response towards the S-CSCF 505 (see messaging 515) and in Step 6 on the originating side the S-CSCF 505 forwards the SIP 183 offer response to the P-CSCF 504 (see messaging 517). At step 7, the P-CSCF 504 may authorize the QoS resources upon receipt of the offer response in a SIP 183 session response to an initial SDP offer sent by a SIP INVITE request (see block 519). Here, the P-CSCF 404 attempts to set up a QoS flow for IMS MMTEL, e.g., via the RAN which may be a 5G-RAN (see 521).

In the mobile-originating user case, the 5G-RAN also may reject the PDU Session modification that may set up the QoS flow for IMS MMTEL, thus triggering the UE 503 to fallback to the EPS (see block 522). Moreover, if the N26 interface (connecting AMF 142 to the MME 146) is not employed, then the UE 503 may need to detach from the 5GS and fallback to the EPS by following the procedure for initial attachment to the EPS, thus introducing delay to the IMS MMTEL session setup and thereby IMS signaling may be lost if TCP is not employed between the UE 503 and P-CSCF 504.

At Step 8, after the QoS flow for IMS MMTEL is established, the P-CSCF 504 sends the SIP offer response to the UE 503 (see messaging 523). At Step 9, the UE 503 responds with a Provisional Response Acknowledgement ("PRACK") which the P-CSCF 504 receives in a Response Confirm message (see messaging 525). Note that the Response Confirm message may optionally include an SDP offer (e.g., part of codec negotiation and resource allocation). At Step 10, the UE 405 reserves resources (see block 527. At the same time, at Steps 11 and 12, the P-CSCF 504 and S-CSCF 505 forward the Response Confirm message indicating PRACK towards the terminating network 502 (see messaging 529 and 531).

At Step 13, the called party in the terminating network 502 responds to the PRACK with a SIP 200 OK message (see messaging 535). Where the Response Confirm message includes an SDP offer, the 200 OK message may also include an SDP answer. At the same time, at Steps 14 and 15, the S-CSCF 505 and P-CSCF 504 forward the 200 OK message towards the UE 503 (see messaging 537 and 539).

As noted above, EPS fallback introduces delay which could cause the SIP message in step 15 may be lost (e.g., due to the UE being unreachable during the fallback procedure). However, the UE 503 avoids IMS signaling loss by communicating with the P-CSCF 504 via TCP connection (see block 533). As described above, the TCP connection is not end-to-end, and the P-CSCF 504 may use UDP to communicate SIP messages with the S-CSCF 505.

Continuing on FIG. 5B, at Step 16 the UE 503 confirms resource reservation, e.g., by sending a SIP UPDATE message ($3^{rd}$ offer), towards the P-CSCF 504 (see messaging 541). At Steps 17 and 18, the P-CSCF 504 and S-CSCF 505 forward the SIP UPDATE message towards the terminating network 502 (see messaging 543 and 545). At step 19, the terminating network 502 confirms resource reservation, e.g., by sending a SIP 200 OK message for UPDATE, towards the S-CSCF 505 (see messaging 547). At Steps 20 and 21, the S-CSCF 505 and P-CSCF 504 forward the 200 OK message towards the UE 503 (see messaging 549 and 551).

At Step 22, the terminating network 502 sends a SIP 180 Ringing message towards the S-CSCF 505 (see messaging 553). At Steps 23 and 24, the S-CSCF 505 and P-CSCF 504 forward the SIP 180 Ringing message towards the UE 503 (see messaging 555 and 557). At Step 25, the UE 503 alerts the user of the incoming MMTEL call (see block 559).

At Step 26, the user in the terminating network 502 answers the call and the terminating network 502 responds to the SIP INVITE message (received at Step 4) by sending a SIP 200 OK message towards the S-CSCF 505 (see messaging 561). At step 27, the S-CSCF 505 forwards the 200 OK message for INVITE to the P-CSCF 504 (see messaging 563). At step 28, the P-CSCF 404 enables media flows (see block 565). At steps 29, the P-CSCF 504 forwards the 200 OK message (for INVITE) towards the UE 503 (see messaging 567).

At step 30, the UE 503 starts media (see block 569). At step 31, the UE 503 confirms the SIP 200 OK message by sending an ACK message towards the P-CSCF 504 (see messaging 571). At Steps 32 and 33, the P-CSCF 504 and S-CSCF 505 forward the ACK message towards the terminating network 502 (see messaging 573 and 575). The signaling flow 500 ends.

Figure 6:
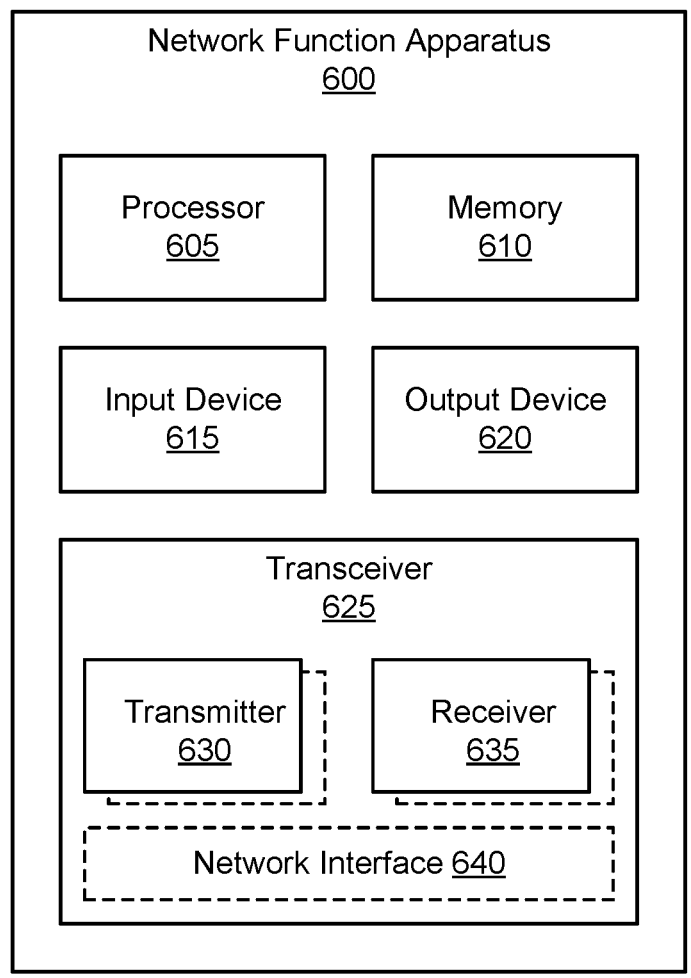
FIG. 6 is a schematic block diagram illustrating one embodiment of a network function apparatus that may be used for selecting a transport layer protocol for SIP messaging.

FIG. 6 depicts one embodiment of a network function apparatus 600 that may be used for selecting a transport layer protocol for SIP messaging, according to embodiments of the disclosure. The network function apparatus 600 may be one embodiment of the P-CSCF 154, P-CSCF 220, P-CSCF 404, and/or P-CSCF 504. Furthermore, the network function apparatus 600 may include a processor 605, a memory 610, an input device 615, an output device 620, a transceiver 625. In some embodiments, the input device 615 and the output device 620 are combined into a single device, such as a touch screen. In certain embodiments, the network function apparatus 600 does not include any input device 615 and/or output device 620.

As depicted, the transceiver 625 includes at least one transmitter 630 and at least one receiver 635. Here, the transceiver 625 communicates with one or more network functions a mobile core network (e.g., a 5GC) and/or one or more network functions in an IMS network. Additionally, the transceiver 625 may support at least one network interface 640. Here, the at least one network interface 640 facilitates communication with the network function(s).

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the transceiver 625 receives a SIP message from a UE (e.g., the remote unit 105, the UE 205, the UE 405, and/or the UE 503). Here, the SIP message includes a first request to initiate a session for IMS MMTEL. The processor 605 determines that the SIP message is communicated using TCP as a transport layer protocol and controls the transceiver 625 to forward the first request to a network entity (e.g., a S-CSCF), wherein the first request is sent using UDP as the transport layer protocol. In some embodiments, the SIP message is a SIP INVITE request.

In some embodiments, the processor 605 identifies the network entity in response to the SIP message and determines a transport protocol for communication with the network entity, wherein the first request is forwarded using UDP in response to the determination. In such embodiments, the determination may be made based on one or more of: the identity of the network entity, a transport protocol type used to communicate the SIP message, a message type of the SIP message, and a transport protocol preference from the UE.

In some embodiments, the transceiver 625 receives a transport protocol preference from the UE, wherein the transport protocol preference indicates TCP as the protocol for reception of SIP messages transmitted to the UE. In such embodiments, receiving the transport protocol preference for reception of the SIP messages may include receiving a SIP REGISTER request from the UE, the SIP REGISTER request comprising a first SIP header field comprising a transport parameter set to TCP to identify the transport protocol preference for reception of SIP messages carried by TCP. In one embodiment, the first SIP header field is a Contact header field.

In various embodiments, the SIP message includes a first SIP header field having a transport parameter set to TCP and a second SIP header field having the transport parameter set to TCP and a transport protocol indicator identifying TCP. Moreover, the SIP message may comprise a parameter identifying IMS MMTEL in at least the first SIP header field, a third SIP header field, and a fourth SIP header field. Here, the parameter identifying IMS MMTEL may be at least one of: a MMTEL feature tag, an MMTEL ICSI, and an MMTEL IARI.

In certain embodiments, the first SIP header field is a Contact header field 315, the second SIP header field is a Via header field 320, the third SIP header field is an Accept-Contact header field 325, and the fourth SIP header field is a Feature-Caps header field 330. In certain embodiments, the transport parameter is set to TCP by setting the value of a URI parameter in a header field of the received first request as "transport=tcp", wherein forwarding the first request (SIP INVITE) to the network entity (S-CSCF) includes setting the value of the URI parameter in the header field of the forwarded first request as "transport=udp."

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to selecting transport layer protocol for IMS signaling, for example storing SIP messages, UE transport layer preferences, a policy rules for transport layer protocol selection, and the like. In certain embodiments, the memory 610 also stores program code and related data, such as an operating system ("OS") or other controller algorithms operating on the network function apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

In various embodiments, the transceiver 625 includes at least one transmitter 630 and at least one receiver 635. One or more transmitters 630 and one or more receivers 635 may be used to provide SIP signaling as described herein. Although only one transmitter 630 and one receiver 635 are illustrated, the network function apparatus 600 may have any suitable number of transmitters 630 and receivers 635. Further, the transmitter(s) 630 and the receiver(s) 635 may be any suitable type of transmitters and receivers. In some embodiments, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an application specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
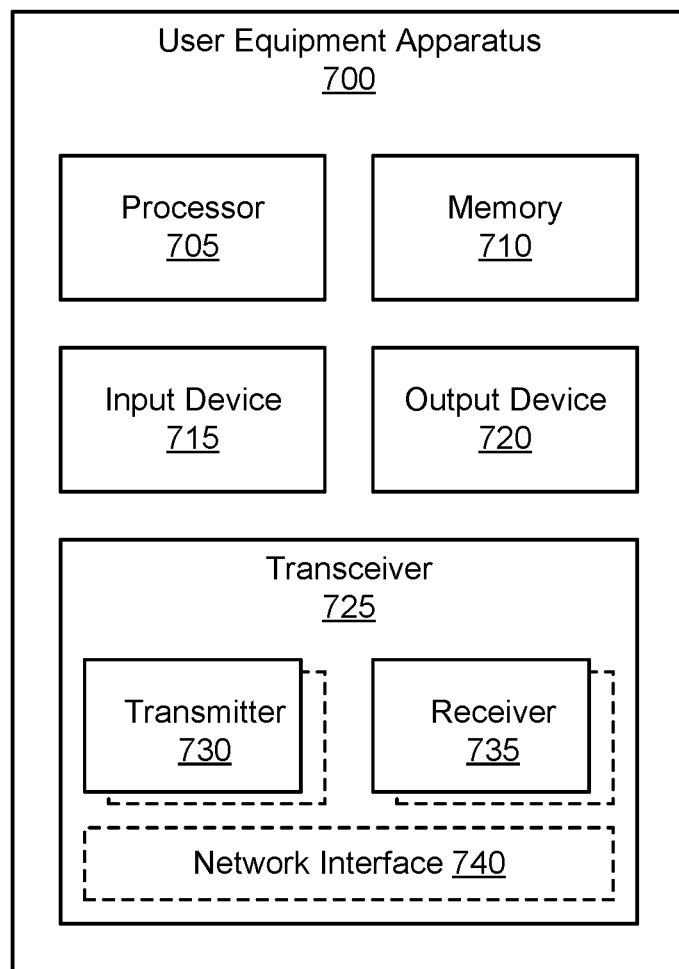
FIG. 7 is a schematic block diagram illustrating one embodiment of a user equipment apparatus that may be used for selecting a transport layer protocol for SIP messaging.

FIG. 7 depicts one embodiment of a network equipment apparatus 700 that may be used for selecting a transport layer protocol for SIP messaging, according to embodiments of the disclosure. The network equipment apparatus 700 may be one embodiment of the remote unit 105. Furthermore, the network equipment apparatus 700 may include a processor 705, a memory 710, an input device 715, an output device 720, a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with a mobile core network (e.g., a 5GC) via an access network, e.g., containing a RAN node. Additionally, the transceiver 725 may support at least one network interface 740. Here, the at least one network interface 740 facilitates communication with an eNB, gNB, or other RAN node (e.g., using the "Uu" interface). Additionally, the at least one network interface 740 may include an interface used for communications with an UPF, an SMF, and/or a P-CSCF.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 indicates a transport layer preference for TCP to an IMS network, for example to a P-CSCF in the IMS network. In one embodiment, the processor 705 adds a transport parameter to one or more headers of a SIP Invite message, as discussed in further detail above. In one embodiment, the processor adds a transport protocol preference to a SIP Register message, as discussed in further detail above.

In certain embodiments, the processor adds a parameter to a SIP message used in IMS signaling (e.g., SIP Invite message) indicating support for EPS fallback without a N26 interface. In certain embodiments, the processor 605 adds a parameter to a SIP message used in IMS signaling that indicates connection to a 5GS without N26 interface. s The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to selecting transport layer protocol for IMS signaling, for example storing transport layer preference, N26 status, SIP messages, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

In various embodiments, the transceiver 725 includes at least one transmitter 730 and at least one receiver 735. One or more transmitters 730 may be used to provide UL communication signals to a base unit 110, for example containing IMS signaling. Similarly, one or more receivers 735 may be used to receive DL communication signals from the base unit 110, as described herein. Although only one transmitter 730 and one receiver 735 are illustrated, the network equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an application specific integrated circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
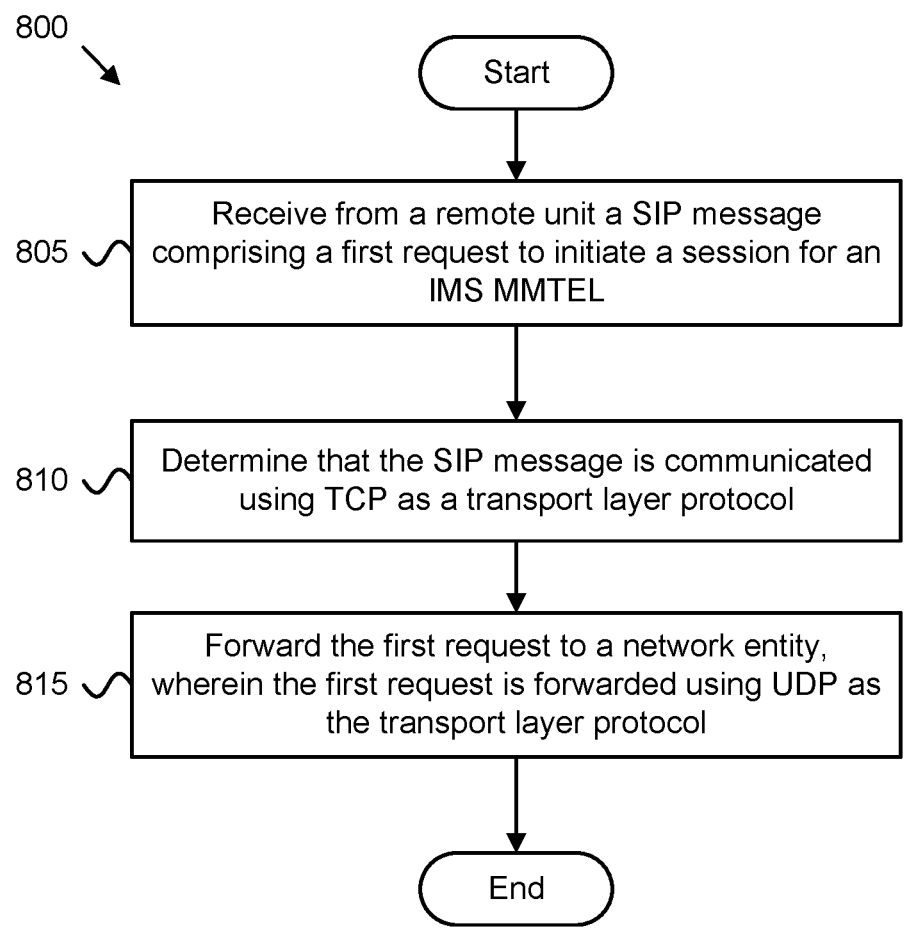
FIG. 8 is a flowchart diagram illustrating one embodiment of a method for selecting a transport layer protocol for SIP messaging.

FIG. 8 depicts a method 800 for selecting a transport layer protocol for SIP messaging, according to embodiments of the disclosure. In some embodiments, the method 800 is performed by an apparatus, such as the remote unit 105, the UE 205, the UE 405, the UE 503, and/or the network function apparatus 600. In certain embodiments, the method 800 may be performed by a processor executing program code, for example, a microcontroller, a microprocessor, a CPU, a GPU, an auxiliary processing unit, a FPGA, or the like.

The method 800 begins and receives 805 from a remote unit (e.g., a UE) a SIP message comprising a first request to initiate a session for IMS MMTEL. The method 800 includes determining 810 that the SIP message is communicated using TCP as the transport layer protocol. The method includes forwarding 815 the first request to a network entity (e.g., a S-CSCF), wherein the first request is forwarded using UDP as the transport layer protocol. The method 800 ends.

Disclosed herein is a first apparatus for selecting a transport layer protocol for SIP messaging. The first apparatus may be implemented by a network function, such as the P-CSCF 154, the P-CSCF 220, the P-CSCF 404, the P-CSCF 504, and/or network function apparatus 600. The first apparatus includes a transceiver that receives a session initiation protocol ("SIP") message from a remote unit (e.g., a UE). Here, the SIP message includes a first request to initiate a session for an IMS Multimedia Telephony Communication Service ("MMTEL"). The first apparatus includes a processor that determines that the SIP message is communicated using TCP as a transport layer protocol and forwards the first request to a network entity (e.g., a S-CSCF), wherein the first request is sent using UDP as the transport layer protocol.

In some embodiments, the processor identifies the network entity in response to the SIP message and determines a transport protocol for communication with the network entity, wherein the first request is forwarded using UDP in response to the determination. In such embodiments, the determination is made based on one or more of: the identity of the network entity (e.g., the network entity being S-CSCF), a transport protocol type used to communicate the SIP message, a message type of the SIP message, and a transport protocol preference from the remote unit.

In some embodiments, the transceiver receives a transport protocol preference from the remote unit, wherein the transport protocol preference indicates TCP as the protocol for reception of SIP messages transmitted to the remote unit. In certain embodiments, receiving the transport protocol preference for reception of the SIP messages comprises receiving a SIP REGISTER request from the remote unit, the SIP REGISTER request comprising a first SIP header field comprising a transport parameter set to TCP to identify the transport protocol preference for reception of SIP messages carried by TCP. In one embodiment, the first SIP header field is a Contact header field.

In some embodiments, the apparatus comprises a P-CSCF, wherein the network entity (to which the SIP message is forwarded using UDP as the transport layer protocol) is a S-CSCF. In some embodiments, the SIP message is a SIP INVITE request.

In various embodiments, the SIP message includes a first SIP header field having a transport parameter set to TCP and a second SIP header field having the transport parameter set to TCP and a transport protocol indicator identifying TCP. In various embodiments, at least the first SIP header field, a third SIP header field, and a fourth SIP header field comprise a parameter identifying IMS MMTEL, said parameter comprising at least one of: a feature tag, an IMS communication service identifier ("ICSI"), and an IMS application reference identifier ("IARI").

In certain embodiments, the transport parameter is set to TCP by setting the value of a URI parameter in a header field of the received first request as "transport=tcp." In such embodiments, forwarding the first request to the network entity includes setting the value of the URI parameter in the header field of the forwarded first request as "transport=udp." In certain embodiments, the first SIP header field is a Contact header field, the second SIP header field is a Via header field, the third SIP header field is an Accept-Contact header field, and the fourth SIP header field is a Feature-Caps header field.

Disclosed herein is a first method for selecting a transport layer protocol for SIP messaging. The first method may be performed by a network function, such as the P-CSCF 154, the P-CSCF 220, the P-CSCF 404, the P-CSCF 504, and/or the network function apparatus 600. The first method includes receiving from a remote unit (e.g., a UE) a session initiation protocol ("SIP") message comprising a first request to initiate a session for an Internet Protocol Multimedia Subsystem ("IMS") Multimedia Telephony Communication Service ("MMTEL"). The first method includes determining that the SIP message is communicated using transmission control protocol ("TCP") as a transport layer protocol and forwarding the first request to a network entity (e.g., a S-CSCF), wherein the first request is forwarded using user datagram protocol ("UDP") as the transport layer protocol.

In some embodiments the first method further includes identifying the network entity in response to the SIP message and determining a transport protocol for communication with the network entity, wherein the first request is forwarded using UDP in response to the determination. In such embodiments, the determination is made based on one or more of: the identity of the network entity (e.g., the network entity being S-CSCF), a transport protocol type used to communicate the SIP message, a message type of the SIP message, and a transport protocol preference from the remote unit.

In some embodiments the first method further includes receiving a transport protocol preference from the remote unit, wherein the transport protocol preference indicates TCP as the protocol for reception of SIP messages transmitted to the remote unit. In such embodiments, the remote unit identifies its transport protocol preference for reception of the SIP messages by transmitting a SIP REGISTER request to the first network entity, the SIP REGISTER request comprising a first SIP header field comprising a transport parameter set to TCP to identify a transport protocol preference for reception of SIP messages carried by TCP. In one embodiment, the first SIP header field is a Contact header field.

In some embodiments, first request is received by a Proxy-Call Session Control Function ("P-CSCF"), wherein the P-CSCF forwards the first request to the network entity. In some embodiments, the network entity is a Serving-Call Session Control Function ("S-CSCF"). In some embodiments, the SIP message is a SIP INVITE request.

In various embodiments, the SIP message includes a first SIP header field having a transport parameter set to TCP and a second SIP header field having the transport parameter set to TCP and a transport protocol indicator identifying TCP. In various embodiments, at least the first SIP header field, a third SIP header field, and a fourth SIP header field comprise a parameter identifying IMS MMTEL, said parameter comprising at least one of: a feature tag, an IMS communication service identifier ("ICSI"), and an IMS application reference identifier ("IARI").

In certain embodiments, the transport parameter is set to TCP by setting the value of a URI parameter in a header field of the received first request as "transport=tcp." In such embodiments, forwarding the first request to the network entity includes setting the value of the URI parameter in the header field of the forwarded first request as "transport=udp." In certain embodiments, the first SIP header field is a Contact header field, the second SIP header field is a Via header field, the third SIP header field is an Accept-Contact header field, and the fourth SIP header field is a Feature-Caps header field.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
  a transceiver that receives a session initiation protocol ("SIP") message from a remote unit, the SIP message comprising a first request to initiate a session for an Internet Protocol Multimedia Subsystem ("IMS") Multimedia Telephony Communication Service ("MMTEL"), wherein the SIP message comprises:
    a first SIP header field having a transport parameter set to TCP; and
    a second SIP header field having the transport parameter set to TCP and a transport protocol indicator identifying TCP, and
    a parameter identifying IMS MINITEL, said parameter comprising at least one of: a feature tag, an IMS communication service identifier ("ICSI"), and an IMS application reference identifier ("TART"); and
  a processor that:
    determines that the SIP message is communicated using transmission control protocol ("TCP") as a transport layer protocol; and
    forwards the first request to a network entity, wherein the first request is sent using user datagram protocol ("UDP") as the transport layer protocol.

2. The apparatus of claim 1, wherein the processor identifies the network entity in response to the SIP message and determines a transport protocol for communication with the network entity, wherein the first request is forwarded using UDP in response to the determination.

3. The apparatus of claim 2, wherein the determination is made based on one or more of: the identity of the network entity, a transport protocol type used to communicate the SIP message, a message type of the SIP message, and a transport protocol preference from the remote unit.

4. The apparatus of claim 1, wherein the transceiver receives a transport protocol preference from the remote unit, wherein the transport protocol preference indicates TCP as the protocol for reception of SIP messages transmitted to the remote unit.

5. The apparatus of claim 4, wherein receiving the transport protocol preference for reception of the SIP messages comprises receiving a SIP REGISTER request from the remote unit, the SIP REGISTER request comprising a first SIP header field comprising a transport parameter set to TCP to identify the transport protocol preference for reception of SIP messages carried by TCP.

6. The apparatus of claim 5, wherein the first SIP header field is a Contact header field.

7. The apparatus of claim 1, wherein the apparatus comprises a Proxy-Call Session Control Function ("P-CSCF"), wherein the network entity is a Serving-Call Session Control Function ("S-CSCF").

8. The apparatus of claim 1, wherein the SIP message is a SIP INVITE request.

9. The apparatus of claim 1, wherein at least the first SIP header field, a third SIP header field, and a fourth SIP header field comprise the parameter identifying IMS MINITEL.

10. The apparatus of claim 9, wherein the first SIP header field is a Contact header field, wherein the second SIP header field is a Via header field, wherein the third SIP header field is an Accept-Contact header field, and wherein the fourth SIP header field is a Feature-Caps header field.

11. The apparatus of claim 1, wherein the transport parameter is set to TCP by setting the value of a URI parameter in a header field of the received first request as "transport=tcp", wherein forwarding the first request to the network entity comprises setting the value of the URI parameter in the header field of the forwarded first request as "transport=udp."

12. A method comprising:
  receiving from a remote unit a session initiation protocol ("SIP") message comprising a first request to initiate a session for an Internet Protocol Multimedia Subsystem ("IMS") Multimedia Telephony Communication Service ("MMTEL"), wherein the SIP message comprises:
a first SIP header field having a transport parameter set to TCP; and
a second SIP header field having the transport parameter set to TCP and a transport protocol indicator identifying TCP, and
a parameter identifying IMS MINITEL, said parameter comprising at least one of: a feature tag, an IMS communication service identifier ("ICSI"), and an IMS application reference identifier ("IARI");
determining that the SIP message is communicated using transmission control protocol ("TCP") as a transport layer protocol; and
forwarding the first request to a network entity, wherein the first request is forwarded using user datagram protocol ("UDP") as the transport layer protocol.

13. The method of claim 12, further comprising identifying the network entity in response to the SIP message and determining a transport protocol for communication with the network entity, wherein the first request is forwarded using UDP in response to the determination.

14. The method of claim 13, wherein the determination is made based on one or more of: the identity of the network entity, a transport protocol type used to communicate the SIP message, a message type of the SIP message, and a transport protocol preference from the remote unit.

15. The method of claim 12, further comprising receiving a transport protocol preference from the remote unit, wherein the transport protocol preference indicates TCP as the protocol for reception of SIP messages transmitted to the remote unit.

16. The method of claim 15, wherein the remote unit identifies its transport protocol preference for reception of the SIP messages by transmitting a SIP REGISTER request to the first network entity, the SIP REGISTER request comprising a first SIP header field comprising a transport parameter set to TCP to identify a transport protocol preference for reception of SIP messages carried by TCP.

17. The method of claim 16, wherein the first SIP header field is a Contact header field.

18. The method of claim 12, wherein first request is received by a Proxy-Call Session Control Function ("P-CSCF"), wherein the P-CSCF forwards the first request to the network entity.

19. The method of claim 12, wherein the network entity is a Serving-Call Session Control Function ("S-CSCF").

20. The method of claim 12, wherein the SIP message is a SIP INVITE request.

21. The method of claim 12, wherein at least the first SIP header field, a third SIP header field, and a fourth SIP header field comprise the parameter identifying IMS MINITEL.

22. The method of claim 21, wherein the first SIP header field is a Contact header field, wherein the second SIP header field is a Via header field, wherein the third SIP header field is an Accept-Contact header field, and wherein the fourth SIP header field is a Feature-Caps header field.

23. The method of claim 12, wherein the transport parameter is set to TCP by setting the value of a URI parameter in a header field of the received first request as "transport=tcp", wherein forwarding the first request to the network entity comprises setting the value of the URI parameter in the header field of the forwarded first request as "transport=udp."

* * * * *